United States Patent
Kane et al.

(10) Patent No.: US 7,356,496 B2
(45) Date of Patent: Apr. 8, 2008

(54) SYSTEM AND METHOD FOR SYNCHRONIZING LEDGER ACCOUNTS BY COMPANY GROUP

(75) Inventors: Timothy R. Kane, Endicott, NY (US); Thomas William Rath, Owego, NY (US); Russell Thomas White, Jr., Conklin, NY (US); Sherry Lee Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 09/815,317

(22) Filed: Mar. 22, 2001

(65) Prior Publication Data

US 2002/0138375 A1 Sep. 26, 2002

(51) Int. Cl.
*G06Q 30/00* (2006.01)
(52) U.S. Cl. .......................... 705/30; 705/27
(58) Field of Classification Search .................. 705/30, 705/31, 32, 33, 34, 29, 26, 27, 28
See application file for complete search history.

(56) References Cited

U.S. PATENT DOCUMENTS

| | | | | |
|---|---|---|---|---|
| 5,390,113 A | * | 2/1995 | Sampson | 705/30 |
| 5,758,327 A | * | 5/1998 | Gardner et al. | 705/26 |
| 5,781,908 A | * | 7/1998 | Williams et al. | 709/223 |
| 6,055,516 A | * | 4/2000 | Johnson et al. | 705/27 |
| 6,151,608 A | * | 11/2000 | Abrams | 707/204 |
| 6,631,382 B1 | * | 10/2003 | Kouchi et al. | 707/102 |
| 6,668,253 B1 | * | 12/2003 | Thompson et al. | 707/10 |
| 6,681,229 B1 | * | 1/2004 | Cason et al. | 707/101 |
| 6,684,384 B1 | * | 1/2004 | Bickerton et al. | 717/108 |
| 2002/0091597 A1 | * | 7/2002 | Teng | 705/30 |

* cited by examiner

*Primary Examiner*—Gerald J. O'Connor
(74) *Attorney, Agent, or Firm*—Shelley M. Beckstrand; William E. Schiesser

(57) ABSTRACT

A system and method for keeping ledger accounts in synchronization between a back-end procurement system and a front-end requisition and catalog system. An extract utility extracts a file of general ledger (G/L) accounts, including account code, description, and company code, from a chart of accounts in the back-end and transfers it to the front-end, where it is updated by an update utility to include company group code from a company group table and then loaded into a data store of valid general ledger accounts. Maintenance of the front end data store of valid accounts includes pushing to all companies in a company group ledger code entered with respect to any one of the companies in that group.

1 Claim, 4 Drawing Sheets

SYSTEM AND METHOD FOR SYNCHRONIZING LEDGER ACCOUNTS BY COMPANY GROUP

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend", now U.S. Pat. No. 6,681,229 B1, issued 20 Jan. 2004;

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar";

Ser. No. 09/819,462, filed 28 Mar. 2001, entitled "SYSTEM AND METHOD FOR AUTOMATING INVOICE PROCESSING WITH POSITIVE CONFIRMATION";

Ser. No. 09/815,318, filed 22 Mar. 2001, entitled "SYSTEM AND METHOD FOR GENERATING A COMPANY GROUP USER PROFILE";

Ser. No. 09/819,437, filed 28 Mar. 2001, entitled "SYSTEM AND METHOD FOR SHARING DATA ACROSS FRAMES USING ENVIRONMENT VARIABLES";

Ser. No. 09/815,320, filed 22 Mar. 2001, entitled "SYSTEM AND METHOD FOR GROUPING COMPANIES ACCORDING TO ACCOUNTING SYSTEM OR RULES";

Ser. No. 09/815,316, filed 22 Mar. 2001, entitled "SYSTEM AND METHOD FOR FRAME STORAGE OF EXECUTABLE CODE";

Ser. No. 09/815,313, filed 22 Mar. 2001, entitled "SYSTEM AND METHOD FOR INVOICE IMAGING THROUGH NEGATIVE CONFIRMATION PROCESS";

Ser. No. 09/815,312, filed 22 Mar. 2001, entitled "SYSTEM AND METHOD FOR LEVERAGING PROCUREMENT ACROSS COMPANIES AND COMPANY GROUPS";

Ser. No. 09/816,264, filed 23 Mar. 2001, entitled "SYSTEM AND METHOD FOR PROCESSING TAX CODES BY COMPANY GROUP"; and Ser. No. 09/798,598, filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to accounting and procurement systems. More particularly, it relates to synchronizing ledger accounts by company group between a front-end requisition and catalog system and a back-end accounting and procurement system.

2. Background Art

There is a need in the art for a system and method for keeping ledger accounts in synchronization between a back-end procurement system and a front-end requisition and catalog system.

In such a system, the same general ledger accounts must exist in each system. This is typically solved by daily bridging of accounts from the back-end procurement system to the front-end requisition and catalog system.

However, maintaining such synchronization when implemented for many different customer companies by an enterprise providing procurement services to these customer companies is complex and time consuming, often involving manual updating of a vast number of commodity documents describing the commodities available to customers entering requisitions. There is, therefore, a need for a much simplified and automatic synchronization process.

It is an object of the invention to provide an improved system and method for synchronizing ledger accounts between a back-end procurement system and a front-end requisition and catalog system.

It is a further object of the invention to provide a system and method for synchronizing such ledger accounts in an enterprise on behalf of a large number of customer companies.

SUMMARY OF THE INVENTION

A system and method for keeping ledger accounts in synchronization between a back-end procurement system and a front-end requisition and catalog system. An extract utility extracts a file of general ledger (G/L) accounts, including account code, description, and company code, from a chart of accounts in the back-end and transfers it to the front-end, where it is updated by an update utility to include company group code from a company group table and then loaded into a data store of valid general ledger accounts. Maintenance of the front end data store of valid accounts includes pushing to all companies in a company group code entered with respect to one of the companies in that group.

In accordance with an aspect of the invention, there is provided a computer program product configured to be operable for maintaining ledger accounts in synchronization between a back-end procurement system and a front-end requisition and catalog system where they are associated by company group code.

Other features an d advantages of this invention will become apparent from the following detailed description of the presently preferred embodiment of the invention, taken in conjunction with the accompanying drawings.

BEST MODE FOR CARRYING OUT THE INVENTION

Figure 1:
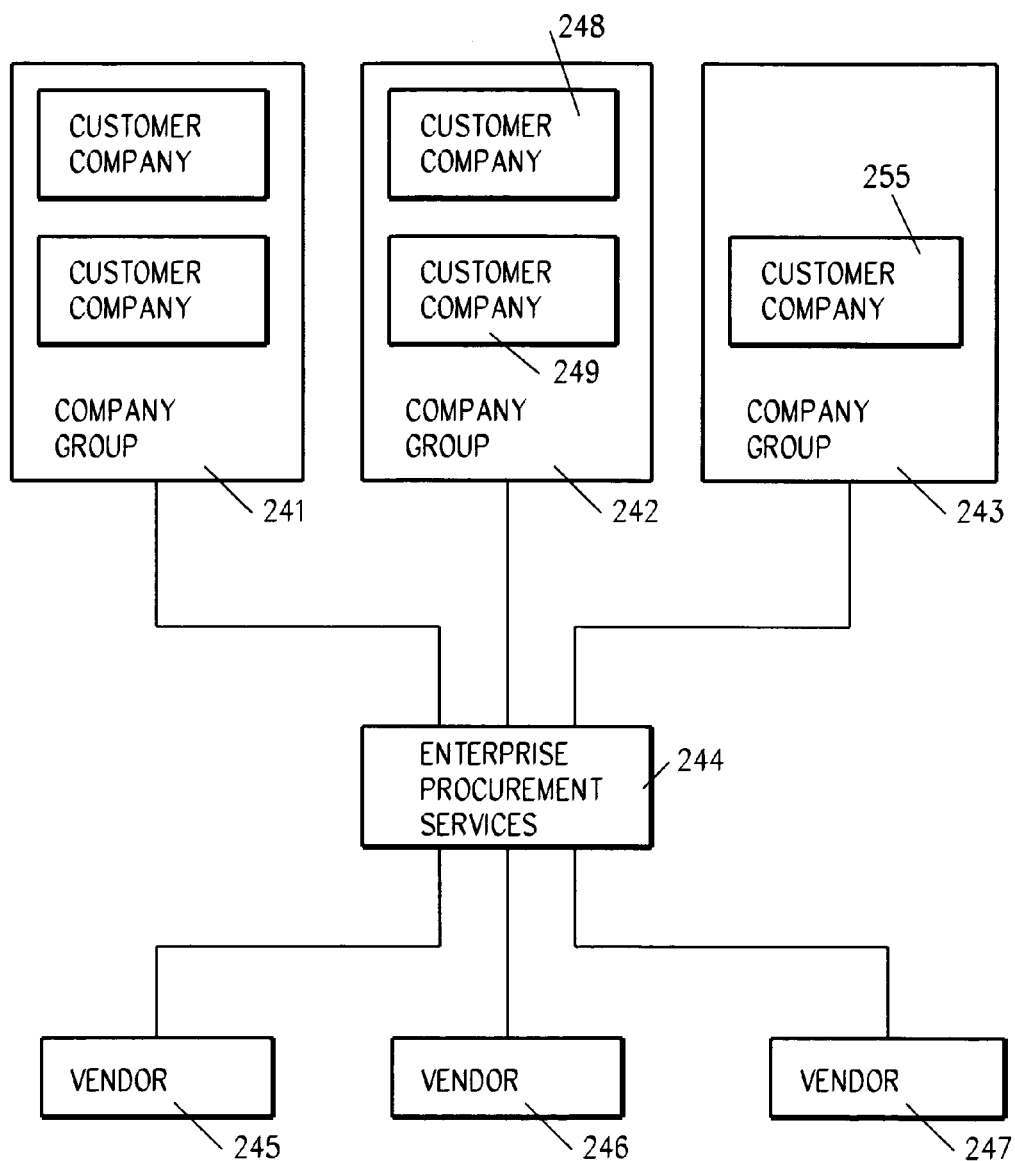
FIG. 1 is a high level system diagram illustrating an enterprise system for providing procurement services with respect to a plurality of vendors on behalf of a plurality of company groups of related customer companies in accordance with the preferred embodiment of the invention.

Referring to FIG. 1, the procurement services organization of an enterprise 244 provides procurement services to a plurality of companies 248, 249 organized in a plurality of company groups 241-243 with respect to a plurality of vendors 245-247.

Figure 2:
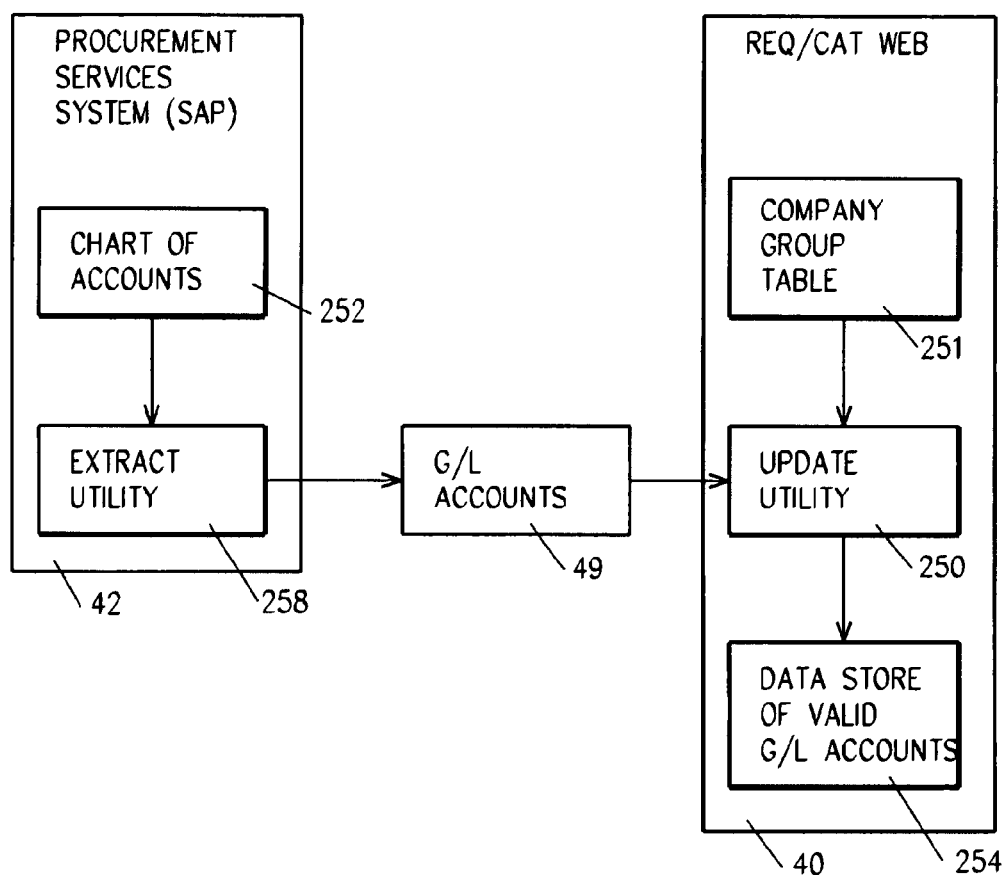
FIG. 2 is a diagram illustrating the extract and update utilities of the preferred embodiment of the invention for synchronizing the chart of accounts by company group code across front-end and back-end systems.
Figure 3:
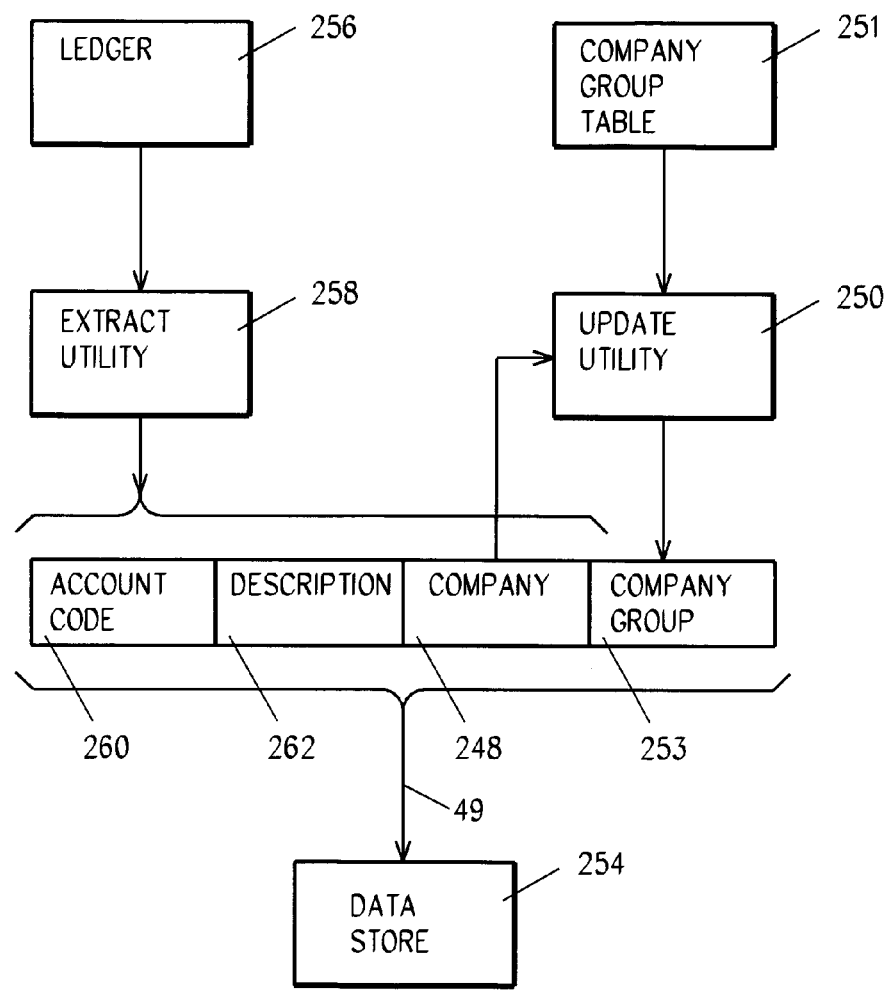
FIG. 3 is a diagram illustrating the generation of a data store of valid accounts.

Referring to FIGS. 2 and 3, in accordance with a preferred embodiment of the invention, a system and method is provided for keeping ledger accounts in synchronization between a back-end procurement system 42, a procurement system, such as SAP, and a front-end requisition and catalog system 40, such as the IBM requisition and catalog system referred to as Req/Cat Web. Company grouping codes are applied to general ledger accounts (GL) bridged from SAP to Req/Cat Web (RCW).

In an exemplary embodiment of the invention, an enterprise resource planning system 42, known as SAP, is used as the procurement engine and accounts payable system for an enterprise, such as IBM, which provides procurement services for a plurality of customer companies 248.

REQ/CAT Web (RCW) 40 is a requisition system implemented on a company intranet.

In accordance with the preferred embodiment of the invention a bridge generally comprising an extract utility 258 and an update utility 250 is provided to extract a file of general ledger (G/L) accounts 49, including account code 260, description 262, and company code 248, from a chart of accounts 252 in SAP 42 and transfer it to RCW 40, where it is updated by utility 250 to associate company group code 253 from company group table 251 and then loaded into a data store 254 of valid general ledger accounts. This association of company group code 253 to company 248 may be by physically including field 253 in the data store 254 record, or logically by referencing company group table 251 by company code 248 to obtain company group code 253.

Referring to FIG. 3, the bridge and store are maintained at a company level.

The chart of accounts (also referred to as the general ledger) is combined by company groups in data store 254 for means of access and data integrity.

Figure 4:
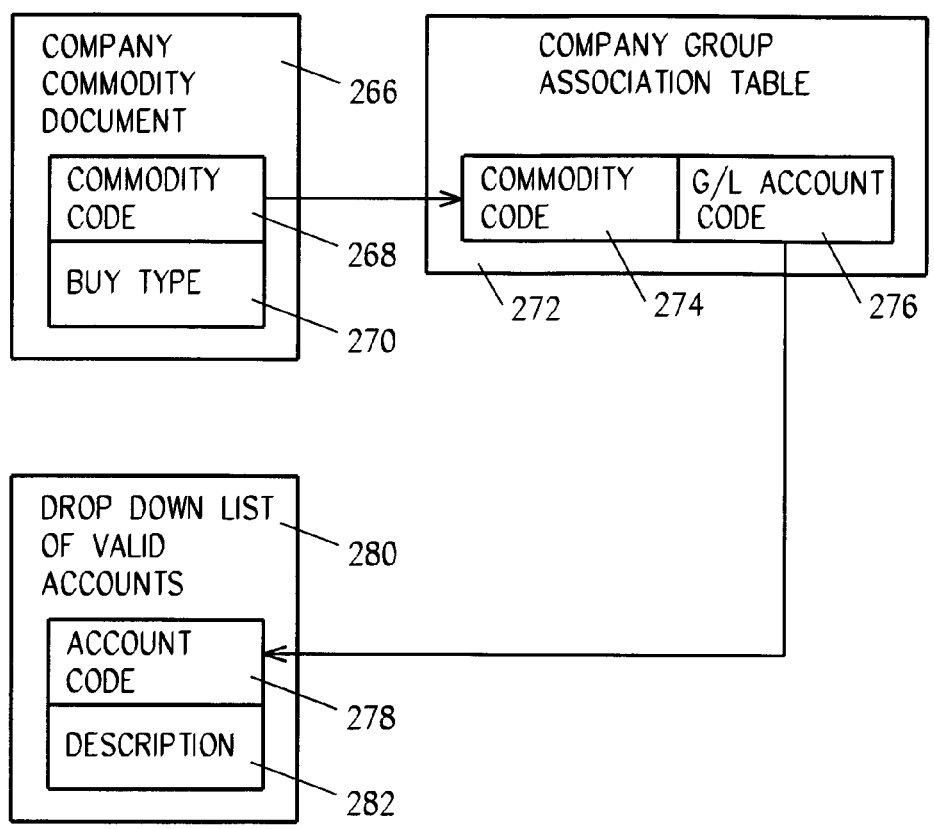
FIG. 4 is a diagram illustrating the generation of a drop down list of account code/description data.

Referring to FIG. 4, a procurement administrator interfaces with RCW 40 to provide for each company commodity code a company commodity document describing in detail the commodity. This commodity document is used in association with a company group association table 272 to generate a drop down list 280 of valid accounts for use by a customer requester in preparing a requisition. Associated with each commodity code 268 are one or more purchasing types, such as expense, capital, external (resale), unallowable and allowable buys. Company group association table 272 is provided for associating commodity codes 268 with general ledger account codes 276 from data store 254. Those account codes 276 corresponding to commodity codes 268 for buy type 270 and company group 242 from table 251 for the company 249 of this customer requestor are presented in drop down list 280 as account codes 278 and description 282.

When updating the company group association table, the addition or change of a commodity code 274/account code 276 association entered on behalf a company 249 is pushed to all other companies 248 in the company group 242.

Advantages over the Prior Art

It is an advantage of the invention that there is provided an improved system and method for synchronizing ledger accounts between a back-end procurement system and a front-end requisition and catalog system.

It is a further advantage of the invention that there is provided a system and method for synchronizing such ledger accounts in an enterprise on behalf of a large number of customer companies.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signal readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java Script, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for maintaining in a digital computer system synchronization of ledger accounts between a back-end procurement system and a front-end requisition and catalog system on behalf of a plurality of customer companies of an enterprise providing procurement services to a plurality of company groups, each said company group including a different plurality of said customer companies, comprising the steps of:

associating a plurality of said customer companies within a company group, said customer companies within said company group storing in respective storage devices a same chart of accounts which varies with respect to a chart of accounts associated with a different company group of customer companies of said enterprise;

maintaining a requisition and catalog system in respective digital computer systems at each said customer company;

maintaining said chart of accounts in a digital storage device at said back-end procurement system at said enterprise;

periodically extracting from said chart of accounts, account identification indicia and descriptive information for a given customer company;

communicating said account identification indicia and descriptive information to said requisition and catalog system for each said customer company of a given company group;

at said requisition and catalog system, storing said indicia and information in an electronic data store of valid general ledger accounts associated with said company group for said given customer company;

associating commodity codes with said account identification indicia;

pushing commodity code/account identification associations to all other companies in said company group of said given customer company;

responsive to a user request for a requisition of a commodity, providing to a user interface of a computer display device a selection list of valid account codes and descriptions authorized for purchase by users from companies within said company group to facilitate selection by a user of a correct account code for said commodity.

* * * * *